US011783677B2

(12) United States Patent
Napolitano

(10) Patent No.: US 11,783,677 B2
(45) Date of Patent: Oct. 10, 2023

(54) EVENT BASED SECOND CHANCE OR RAFFLE BASED ON EXTERNAL EVENT BACKGROUND OF THE INVENTIVE CONCEPT

(71) Applicant: IGT, Las Vegas, NV (US)

(72) Inventor: Thomas Napolitano, East Greenwich, RI (US)

(73) Assignee: IGT, Las Vegas, NV (US)

( * ) Notice: Subject to any disclaimer, the term of this patent is extended or adjusted under 35 U.S.C. 154(b) by 0 days.

(21) Appl. No.: 17/501,016

(22) Filed: Oct. 14, 2021

(65) Prior Publication Data

US 2023/0118069 A1 Apr. 20, 2023

(51) Int. Cl.

| | |
|---|---|
| ***A63F 9/24*** | (2006.01) |
| ***A63F 11/00*** | (2006.01) |
| ***G06F 13/00*** | (2006.01) |
| ***G06F 17/00*** | (2019.01) |
| ***G07F 17/32*** | (2006.01) |
| ***G06Q 50/34*** | (2012.01) |
| ***A63F 3/06*** | (2006.01) |

(52) U.S. Cl.

CPC ........ *G07F 17/3267* (2013.01); *A63F 3/0645* (2013.01); *G06Q 50/34* (2013.01); *G07F 17/329* (2013.01); *G07F 17/3255* (2013.01); *G07F 17/3288* (2013.01)

(58) Field of Classification Search

CPC .............................. G07F 17/32; G07F 17/3214
USPC .............................. 463/1, 15, 17, 20, 22, 25
See application file for complete search history.

(56) References Cited

U.S. PATENT DOCUMENTS

| | | | | |
|---|---|---|---|---|
| 6,527,638 | B1 * | 3/2003 | Walker | G07F 17/32 463/40 |
| 7,704,140 | B2 * | 4/2010 | Finocchio | A63F 3/06 273/138.2 |
| 8,647,196 | B1 * | 2/2014 | Colvin | G07F 17/3225 463/19 |
| 9,669,289 | B2 * | 6/2017 | Lee | A63F 3/00157 |

* cited by examiner

*Primary Examiner* — Adetokunbo O Torimiro
(74) *Attorney, Agent, or Firm* — Sage Patent Group

(57) ABSTRACT

Provided herein are systems methods and devices. Systems disclosed herein include a processor circuit and a memory including machine-readable instructions. When executed by the processor circuit, the machine-readable instructions cause the processor circuit to: provide a lottery game ticket that includes data corresponding to a primary game, receive a registration of the lottery game ticket corresponding to a chance game that includes an outcome that is based on an external event, determine, based on an outcome of the external event, a chance game characteristic to be applied to an entry for the chance game that corresponds to the lottery game ticket, and use the chance game characteristic to determine whether to provide a chance game award to a user.

20 Claims, 4 Drawing Sheets

EVENT BASED SECOND CHANCE OR RAFFLE BASED ON EXTERNAL EVENT BACKGROUND OF THE INVENTIVE CONCEPT

BACKGROUND OF THE INVENTIVE CONCEPT

The inventive concepts disclosed herein relate to the generation, transfer and redemption of lottery tickets having an outcome that is related to an external event.

A lottery game may feature tickets that have the winning/losing numbers. In some embodiments, the winning/losing numbers may be concealed on the game card itself. For example, in the case of an instant win ticket, which may be referred to as a scratch-off ticket, the winning/losing numbers are typically hidden by a coating, which may be removed by rubbing. By removing the coating, the owner of the ticket can instantly determine the ticket's winning status instead of waiting for a matching number to be drawn. In the case of a non-scratch-off, the lottery numbers may be visible and the outcome may be undetermined at a drawing that is conducted at a later date.

Other than just the chance to win the primary game, conventional lottery games may fail to provide any other source of excitement or interest.

SUMMARY OF THE INVENTIVE CONCEPT

A ticket issuer server for providing a digital instant lottery ticket on a digital ledger is provided. The ticket server may perform methods including operations of providing an entry corresponding to a chance game that includes an outcome that is based on an external event, determining, based on an outcome of the external event, a chance game characteristic to be applied to the entry for the chance game, and using the chance game characteristic to determine whether to provide a chance game award to a user.

A system includes a processor circuit and a memory including machine-readable instructions that, when executed by the processor circuit, cause the processor circuit to perform operations including providing a lottery game ticket that includes data corresponding to a primary game and receiving a registration of the lottery game ticket corresponding to a chance game that includes an outcome that is based on an external event. Operations include determining, based on an outcome of the external event, a chance game characteristic to be applied to an entry for the chance game that corresponds to the lottery game ticket. Operations may include and using the chance game characteristic to determine whether to provide a chance game award to a user.

A gaming device includes a processor circuit and a memory including machine-readable instructions that, when executed by the processor circuit, cause the processor circuit to perform operation including providing a digital instant win lottery game ticket that includes data corresponding to a primary game. Operations include receiving an offer to register the digital instant win lottery game ticket into a chance game and cause the registration of the digital instant win lottery game ticket corresponding to the chance game that includes an outcome that is based on an external event. In some embodiments, the chance game characteristic determines an available prize type and entrant pool for a random drawing.

DETAILED DESCRIPTION OF THE INVENTIVE CONCEPT

Figure 1:
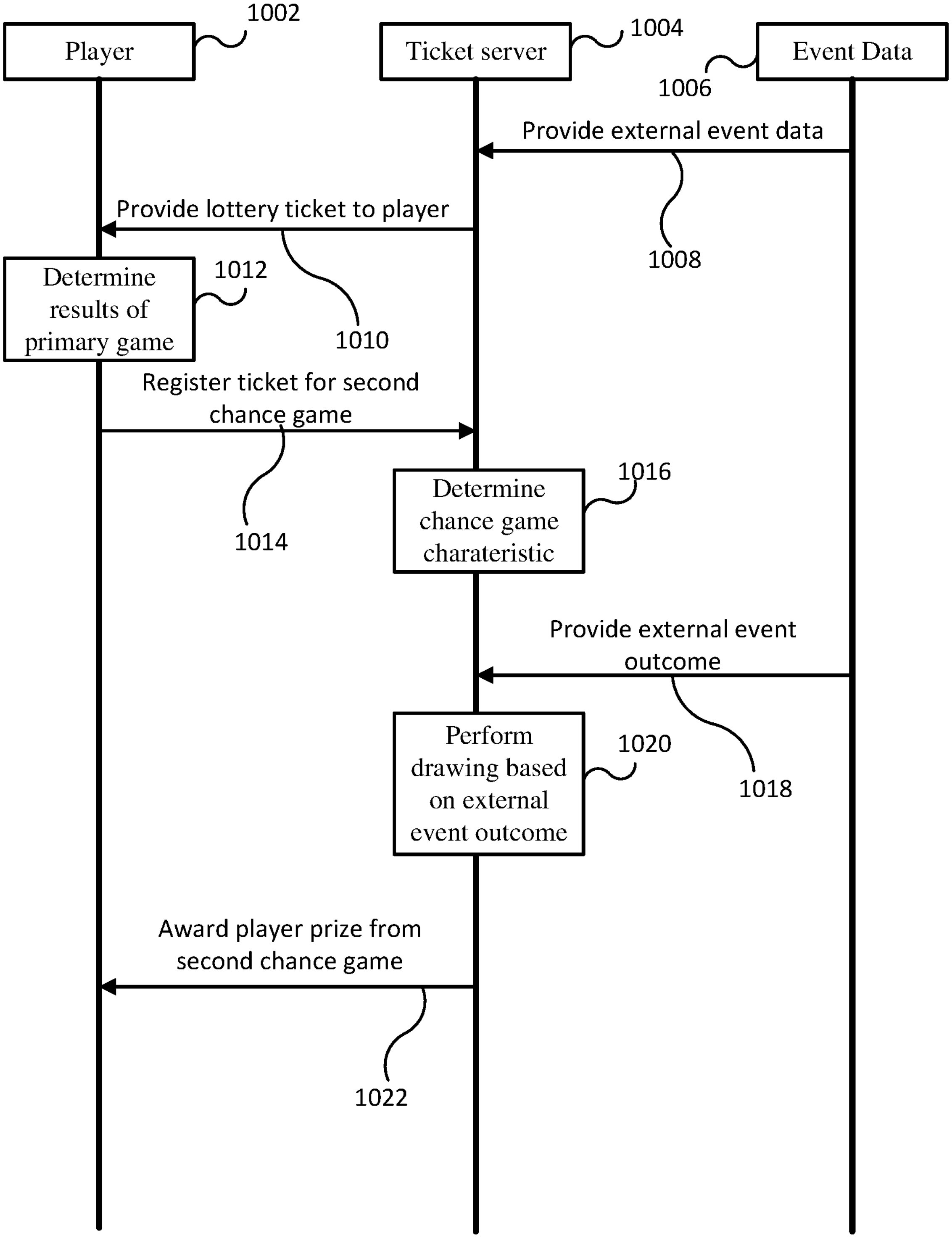
FIG. 1 is a data flow diagram of a system according to some embodiments disclosed herein.

Some embodiments herein may provide a second chance lottery game in which the prizes may be awarded based on the outcome of an external event. Examples of external events may include events corresponding to local and/or regional events, sporting franchises, and/or competitive TV shows, such as reality TV shows, among others. Events related to sports franchises may include sporting team events such as baseball, football, soccer, auto-racing, basketball and/or individual sports, esports and/or simulated video game sporting event, network TV broadcast of esports, social media broadcast on twitch, Facebook or other live social application, and/or other contests, among others. For example, some embodiments may apply to any external event that provides an outcome.

In some embodiments, different prize pools are associated to the different outcomes of the external event. For example, a second chance lottery game may be based on football team "A". Each week a second chance lottery drawing for an instant ticket or online game may provide that the number of prizes and awards are determined based on the outcome of each week's game.

In one example, a game ticket may be related to the outcome of a given week in which team "A" is playing against team "B". The outcome will be one of team "A" winning by more than 21 points, team "A" winning by less than 21 points; and team "A" losing to team "B".

If team "A" wins by more than 21 points then: one winner will be picked to win a suite experience with 10 friends at the next home game against team "C"; twenty-five winners will win $1000 cash; and fifty winners will win an official Team "A" jersey.

If team "A" wins by less than 21 points then: one winner will win 4 tickets to the next home game; 10 winners will win $1000 cash; and 25 winners will win an official team "A" jersey.

If team "A" loses to team "B" then: one winner will win $1000 cash and 10 winners will win an official team "A" jersey.

As provided in this example, a player may purchase a scratch-off game or play an e-instant game on a lottery mobile application and may be offered a second chance opportunity to participate in the second chance draw game based on the player's interest and allegiance to team "A". The outcome of the game will determine which prize pool is available for the second chance draw game. In some embodiments, the outcome of the event only determines which prize pool will be eligible for the second chance draw game and does not affect the determination of the actual winner in the second chance draw game. Thus, the second chance draw game is distinct from actual sports betting and thus should be attractive to the player particularly in jurisdictions that do not allow sports wagering.

Some embodiments provide that all second chance entries are assigned to a promoted event and thus participate in the prize pool that is associated with the outcome of the event.

In some embodiments, the player is asked to select an outcome and, responsive to that selected outcome occurring, the player participates in the drawing for the prize pool that is associated with that outcome. In this manner, the player may be provided the opportunity choose some option some input regarding the outcome.

In large markets in which multiple large events are taking place, players may be provided with a menu of events and outcomes to enter their second chance tickets in. In some embodiments, each of the prize pools may be different.

Some embodiments may not have any sports wagering style or content and, instead, may be based on the publicly available statistics similar to real sports data, fantasy sports data and/or esports. For example, in some embodiments, the results of systems herein may tied to the performance of an individual team/player and not to the results of the underlying event that may typify sports betting.

In some embodiments, a fan of a particular sport franchise may, in addition to rooting for their team to win the game, also rooting for their team to outscore their opponent by as much as possible. Some embodiments provide that by allowing a fan to choose a point spread, the fan may be able to apply their skill and/or knowledge of the game in determining the best outcome to enter their second chance ticket. The lottery results within each prize pool are random and thus the second chance draw game is a lottery game of chance. As such, embodiments herein operate in the absence of a line or other handicapping mechanism.

Some embodiments provide that the player may be encouraged by the excitement of the prizes that are related to an event and/or sporting franchise that the player feels connected to. In some embodiments, the player may be engaged in actively selecting the event to enter thereby applying influence or the perception of influence over the outcome. Some embodiments provide that offering event branded prizes along side monetary wins may create a fresh appeal to new players that may be less familiar to lottery games.

Further, incentives to play scratch-off and/or e-instant tickets may be created by associating them with popular sporting events and sport franchises. Some embodiments provide that the player may be required to register to participate in the second chance draw game thus generating a bridge between the typically anonymous lottery player and the future digitally engaged lottery player. In this manner, an operator may benefit from the co-branding with promoted events and/or sport franchises.

Reference is now made to FIG. 1, which is a data flow diagram of a system according to some embodiments disclosed herein. As illustrated, an external event data source 1006 may provide (block 1008) external event data to a ticket server 1004. Based on the external event data, the ticket server 1004 may provide (1010) a lottery ticket to a player 1002.

The player may determine (block 1012) the results of the primary game. In embodiments herein, the primary game and the external event may be exclusive of one another and only be relevant to one another based on the lottery ticket. For example, the primary game may be a lottery having an outcome that is determined by a lottery drawing while the external event data may correspond to a local and/or regional event and/or group that is unrelated to the lottery.

Regardless of the result of the primary game, the player 1002 may register 1014 the lottery ticket with the ticket server 1004 for a second chance draw. The ticket server 1004 may include separate ticket servers in that one ticket server may provide the lottery ticket to the player 1002 and a different ticket server may provide the second chance game.

The ticket server 1004 may determine the chance game characteristic 1016. In some embodiments, the chance game characteristic may define which prizes and/or types thereof may be provided based on the outcome of the external event. In some embodiments, the chance game characteristic may define which set of prizes may be available based on the outcome of the external event.

The ticket server 1004 may receive information corresponding to the outcome of the external event 1018 and may perform (block 1020) one or more drawings to determine winners in the second chance game and may award the winning players with prizes corresponding to the second chance game 1022.

Figure 2:
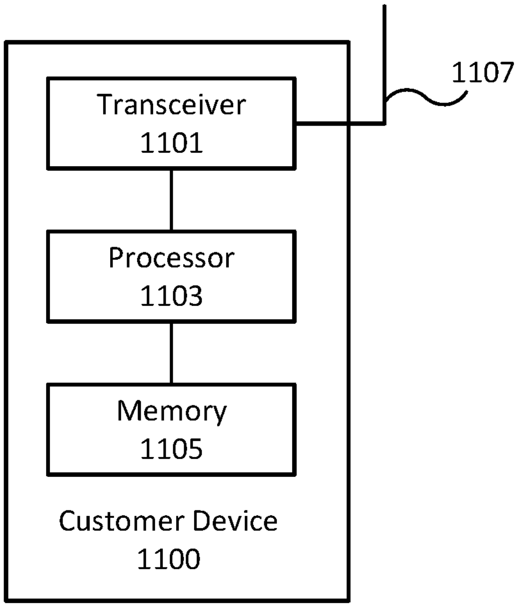
FIG. 2 is a block diagram illustrating some elements of a customer device for providing an event based second chance or raffle according to some embodiments.

Reference is now made to FIG. 2, which is a block diagram illustrating elements of a customer device 1100 (also referred to as a wireless terminal, a mobile equipment (ME), a wireless communication device, a wireless communication terminal, user equipment, a user equipment node/terminal/device, etc.) configured to operate according to embodiments disclosed herein. As shown, the customer device 1100 may include at least one antenna 1107 (also referred to as antenna), and at least one transceiver circuit 1101 (also referred to as transceiver) including a transmitter and a receiver configured to provide uplink and downlink radio communications with a base station or other radio transceiver element of a radio access network. The customer device 1100 may also include at least one processor circuit 1103 (also referred to as processor) coupled to the transceiver 1101, and at least one memory circuit 1105 (also referred to as memory) coupled to the processor 1103. The memory 1105 may include computer readable program code that when executed by the processor 1103 causes the processor 1103 to perform operations according to embodiments disclosed herein for a customer device 1100. According to other embodiments, processor 1103 may be defined to include memory so that a separate memory circuit is not required. The device 1100 may also include an interface (such as a user interface) coupled with processor 1103.

As discussed herein, operations of the customer device 1100 may be performed by processor 1103 and/or transceiver 1101. Alternatively, or additionally, the customer device 1100 may include modules, e.g., software and/or circuitry, that performs respective operations (e.g., operations discussed herein with respect to example embodiments of customer devices 1100).

Operations of a customer device 1100 may include, for example, registering for a second chance draw that includes an outcome that is based on the outcome of an external event.

Figure 3:
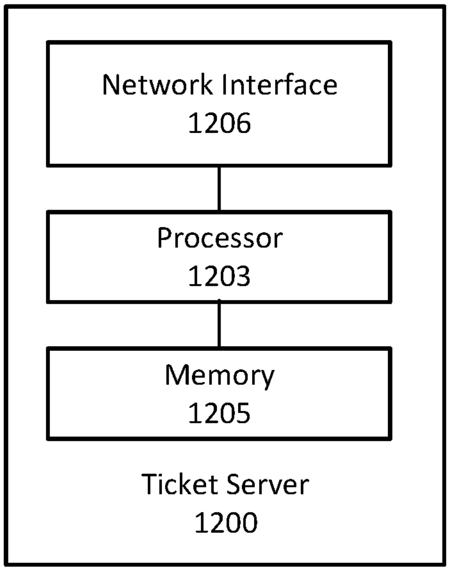
FIG. 3 is a block diagram illustrating some elements of a ticket server for providing an event based second chance or raffle according to some embodiments.

Reference is now made to FIG. 3, which is a block diagram illustrating elements of a ticket server 1200 according to one or more embodiments disclosed herein. As shown, the ticket server 1200 may include at least one network interface circuit 1207 (also referred to as a network interface) configured to provide communications with other nodes, such as a customer device 1100 and/or a key issuer server 1300. The ticket server 1200 may also include at least one processor circuit 1203 (also referred to as a processor) coupled to the network interface 1207, and at least one memory circuit 1205 (also referred to as memory) coupled to the processor 1203. The memory 1205 may include computer readable program code that when executed by the processor 1203 causes the processor 1203 to perform operations according to embodiments disclosed herein for a ticket server 1200. According to other embodiments, processor 1203 may be defined to include memory so that a separate memory circuit is not required.

As discussed herein, operations of the ticket server 1200 may be performed by processor 1203 and/or network interface 1207. For example, processor 1203 may control network interface 1207 to send communications through network interface 1207 to one or more other network nodes and/or other system nodes, and/or to receive communications through network interface 1207 from one or more other network nodes and/or other system nodes. Alternatively, or additionally, the ticket server 1200 may include modules, e.g., circuitry, that performs respective operations (e.g., operations discussed herein with respect to example embodiments of network nodes).

Operations of a ticket server 1200 may include, for example, creating a primary game ticket and offering a second chance game draw based on an outcome of an external event to a purchaser.

Figure 4:
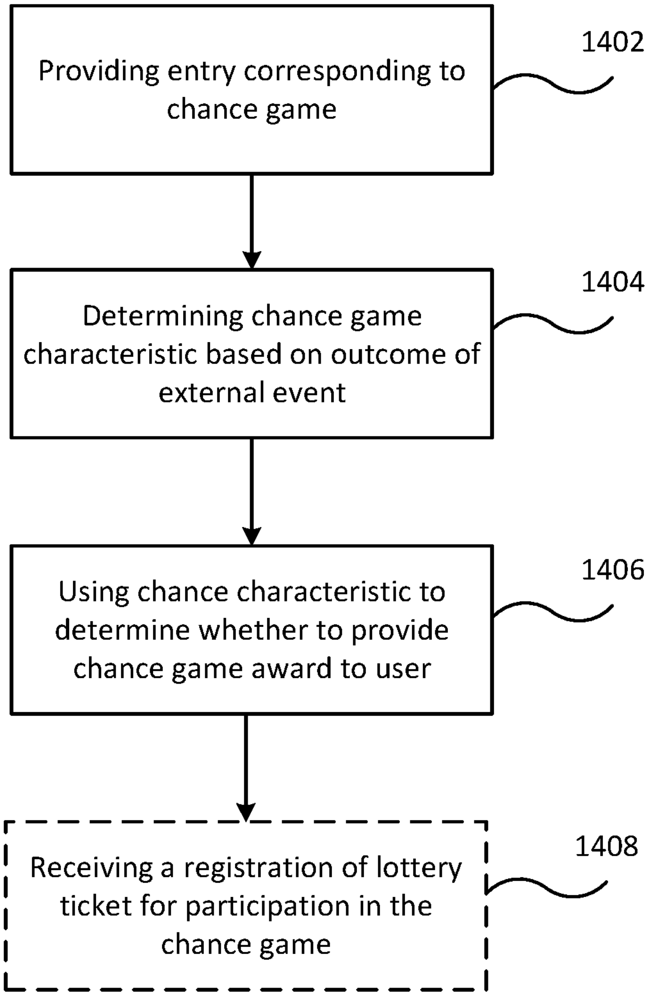
FIG. 4 is a block diagram that illustrates operations of a server for providing an event based second chance or raffle according to some embodiments.

Reference is now made to FIG. 4, which is a block diagram that illustrates operations of a server for providing an event based second chance or raffle according to some embodiments. Operations include providing (block 1402) an entry corresponding to a chance game that includes an outcome that is based on an external event. Operations include determining (block 1404), based on an outcome of the external event, a chance game characteristic to be applied to the entry for the chance game. Some embodiments provide using (block 1406) the chance game characteristic to determine whether to provide a chance game award to a user.

In some embodiments, the outcome that is based on the external event includes a first event outcome or a second event outcome that are different from one another. Some embodiments provide that, responsive to an occurrence of the first event outcome, the entry corresponding to the chance game is determined to be a winner based on being randomly selected by being drawn from a first group of players in the chance game.

In some embodiments, responsive to an occurrence of the second event outcome, the entry corresponding to the chance game is determined to be a winner based on being randomly selected by being drawn from a second group of players in the chance game that is different from the first group of players. In some embodiments, the first group of players is assigned to a first pool of the chance game entrants and the second group of players is assigned to a second pool of the chance game entrants.

In some embodiments, a first quantity of the first group of players are determined to win the chance game that includes a first prize type, a second quantity of the second group of players are determined to with the chance game including a second prize type that is different from the first prize type. Some embodiments provide that the first quantity of the first group of players is different from the second quantity of the second group of players.

In some embodiments, operations provide that in responsive to the occurrence of the second event outcome, the entry corresponding to the chance game is not eligible for participation in the chance game.

In some embodiments, the chance game characteristic includes a type of prize that is provided to a winner of the chance game.

In some embodiments, the entry includes an instant win lottery ticket that comprises a primary game. Some embodiments provide that the chance game includes a second chance game for the instant win lottery ticket. In some embodiments, operations may optionally include receiving (block 1408) a registration of the instant win lottery ticket for participation in the chance game.

In some embodiments, the external event includes an outcome corresponding to a sporting event. Some embodiments provide that the entry is provided to a user based on exchanging non-currency points corresponding to a loyalty program. In some embodiments, the entry is a digital lottery ticket that includes a primary game that is accessed on a mobile terminal. In some embodiments, the chance game is a second chance game for the digital lottery ticket, wherein the method further comprises receiving a registration of the digital lottery ticket for participation in the chance game.

Some embodiments provide that the external event outcome is unrelated to whether a user wins. In some embodiments, the external event corresponds to a local interest event and the entry includes data and graphics that correspond to the local interest event. For example, is a promotion corresponds to a particular brand, such as a sport franchise, then the data and/or graphics may be associated with that brand. For example, sport franchise logos may be included in the data and/or graphics.

Figure 5:
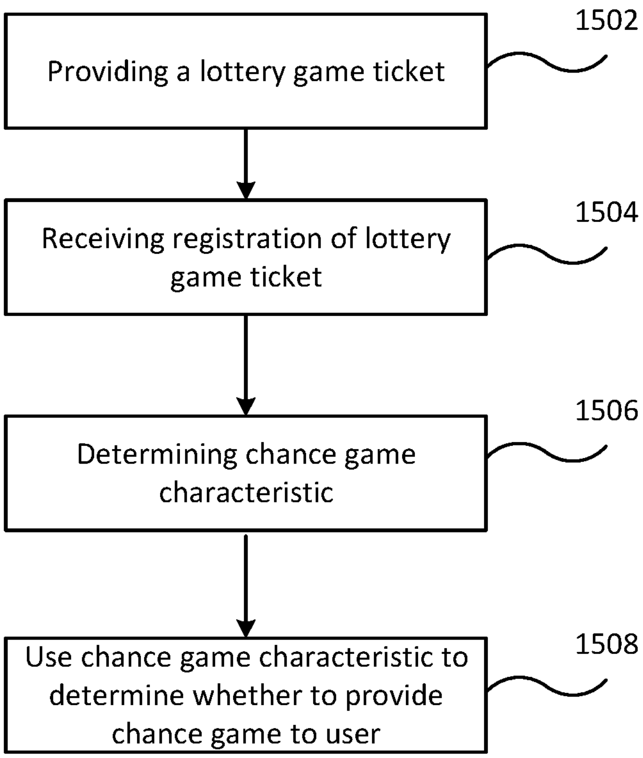
FIG. 5 is a block diagram that illustrates operations according to some embodiments.

Reference is now made to FIG. 5, which is a block diagram that illustrates operations of a system for providing an event based second chance or raffle according to some embodiments. Operations may include providing (block 1502) a lottery game ticket that includes data corresponding to a primary game and receiving (block 1504) a registration of the lottery game ticket corresponding to a chance game that includes an outcome that is based on an external event. Operations may include determining (block 1506), based on an outcome of the external event, a chance game characteristic to be applied to an entry for the chance game that corresponds to the lottery game ticket. In some embodiments, the chance game characteristic includes information regarding what type of prize may be awarded to a winner of the chance game. Some embodiments provide using (block 1508) the chance game characteristic to determine whether to provide a chance game award to a user.

In some embodiments, the outcome that is based on the external event includes a first event outcome or a second event outcome that is different from the first event outcome. Some embodiments provide that, responsive to an occurrence of the first event outcome, the lottery game ticket is determined to be a winner in the chance game based on being randomly selected by being drawn from a first group of players in the chance game.

In some embodiments, responsive to an occurrence of the second event outcome, the lottery game ticket is determined to be a winner of the chance game based on being randomly selected by being drawn from a second group of players in the chance game. Some embodiments provide that the second plurality of players is different from the first plurality of players.

In some embodiments, the primary game and the chance game include unrelated outcomes. For example, the primary game may include a lottery ticket that is unrelated to the second chance game. For example, the winner of the chance game may be based on a random drawing that corresponds to the chance game characteristic.

Figure 6:
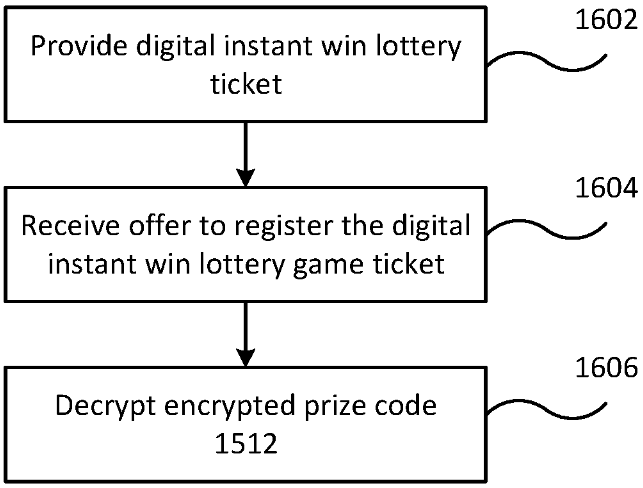
FIG. 6 is a block diagram that illustrates operations of a user device according to some embodiments.

Reference is now made to FIG. 6, which is a block diagram that illustrates operations of a device for providing an event based second chance or raffle according to some embodiments. Operations may include providing (block 1602) a digital instant win lottery game ticket that includes data corresponding to a primary game and receiving (block 1604) an offer to register the digital instant win lottery game ticket into a chance game. Operations include causing (block 1606) the registration of the digital instant win lottery game ticket corresponding to the chance game. In some embodiments, the chance game determines an outcome that is based on an external event. Some embodiments provide that the chance game characteristic determines an available prize type and/or an entrant pool for a random drawing.

In some embodiments, some or all of the operations described herein may be implemented as virtual components executed by one or more virtual machines implemented in one or more virtual environments hosted by one or more of network nodes. Further, in embodiments in which the virtual node is not a radio access node or does not require radio connectivity (e.g., a core network node), then the network node may be entirely virtualized.

The operations may be implemented by one or more applications (which may alternatively be called software instances, virtual appliances, network functions, virtual nodes, virtual network functions, etc.) operative to implement some of the features, functions, and/or benefits of some of the embodiments disclosed herein. Applications are run in a virtualization environment which provides hardware comprising processing circuitry and memory. Memory contains instructions executable by processing circuitry whereby application is operative to provide one or more of the features, benefits, and/or functions disclosed herein.

As will be appreciated by one of skill in the art, the present invention may be embodied as a method, data processing system, and/or computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a tangible computer usable storage medium having computer program code embodied in the medium that can be executed by a computer. Any suitable tangible computer readable medium may be utilized including hard disks, CD ROMs, optical storage devices, or magnetic storage devices.

The embodiments described herein provide useful physical machines and particularly configured computer hardware arrangements of computing devices, servers, electronic gaming terminals, processors, memory, networks, for example. Illustrative systems for implementing the described techniques include a general purpose computing device in the form of a computer, such as a mobile computing device in or a fixed computing device. Components of the computer may include, but are not limited to, a processing unit including a processor circuit, such as a programmable microprocessor or microcontroller, a system memory, and a system bus that couples various system components including the system memory to the processing unit.

The processor circuit may be a multi-core processor including two or more independent processing units. Each of the cores in the processor circuit may support multi-threading operations, i.e., may have the capability to execute multiple processes or threads concurrently. Additionally, the processor circuit 53 may have an on-board memory cache. An example of a suitable multi-core, multithreaded processor circuit is an Intel® Core i7-7920HQ processor, which has four cores that support eight threads each and has an 8 MB on-board cache. In general, the processor circuit may, for example, include any type of general-purpose microprocessor or microcontroller, a digital signal processing (DSP) processor, an integrated circuit, a field programmable gate array (FPGA), a reconfigurable processor, a programmable read-only memory (PROM), or any combination thereof.

The system bus may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer typically includes a variety of computer readable media. Computer readable media can be any available media that can be accessed by computer and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory includes computer storage media in the form of volatile and/or nonvolatile memory such as read only memory (ROM) and random access memory (RAM). A basic input/output system (BIOS), containing the basic routines that help to transfer information between elements within the computer, such as during start-up, is typically stored in the ROM. The RAM typically contains data and/or program modules that are immediately accessible to and/or presently being operated on by the processing unit. The system memory may store an operating system, application programs, other program modules, and program data.

The computer may also include other removable/non-removable, volatile/nonvolatile computer storage media. By way of example only, the computer may include a hard disk drive reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk such as a CD ROM or other optical media. Other removable/non-removable, volatile/nonvolatile computer storage media that can be used in the illustrative operating environment include, but are not limited to, magnetic tape cassettes, flash memory cards, digital versatile disks, digital video tape, solid state RAM, solid state ROM, and the like. The hard disk drive is typically connected to the system bus through a non-removable memory interface.

The drives and their associated computer storage media discussed above provide storage of computer readable instructions, data structures, program modules and other data for the computer. A user may enter commands and information into the computer through input devices such as a keyboard and pointing device, commonly referred to as a mouse, trackball or touch pad. Other input devices (not shown) may include a microphone, joystick, game pad, satellite dish, scanner, touchscreen, or the like. These and other input devices are often connected to the processing unit through a user input interface that is coupled to the system bus, but may be connected by other interface and bus structures, such as a parallel port, game port or a universal serial bus (USB). A monitor or other type of display device is also connected to the system bus via an interface, such as a video interface. In addition to the monitor, computers may also include other peripheral output devices such as speakers and a printer, which may be connected through an output peripheral interface.

The computer may operate in a networked environment using logical connections to one or more remote computers, such as a remote computer. The remote computer may be a personal computer, a server, a router, a network PC, a peer device or other common network node, and typically includes many or all of the elements described above relative to the computer. The logical connections include a local area network (LAN) connection and a wide area network (WAN) connection, but may also include other networks. Such networking environments are commonplace in offices, enterprise-wide computer networks, intranets and the Internet.

When used in a LAN networking environment, the computer may be connected to the LAN through a network interface or adapter. When used in a WAN networking environment, the computer may include a modem or other means for establishing communications over the WAN. The modem, which may be internal or external, may be connected to the system bus via the user input interface, or other appropriate mechanism.

Some embodiments of the present invention are described below with reference to flowchart illustrations and/or block diagrams of methods, systems and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processing circuitry of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the present invention may be written in any conventional procedural programming language, including interpreted languages, assembled languages and/or compiled languages. The program code may execute entirely on the user's computer, partly on the user's computer, as a stand alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed typical embodiments of the invention and, although specific terms are employed, they are used in a generic and descriptive sense only and not for purposes of limitation, the scope of the inventive concepts being set forth in the following claims.

What is claimed is:

1. A method comprising:

providing, via a processor circuit, an entry corresponding to a chance game that comprises an outcome that is based on an external event;

determining, via the processor circuit and based on an outcome of the external event, a chance game characteristic to be applied to the entry for the chance game; and using, via the processor, the chance game characteristic to determine whether to provide a chance game award to a user, wherein the chance game and the external event are exclusive of one another and are relevant to one another based on the entry, and wherein the method further comprises awarding the chance game award based on determining whether to provide the chance award the to the user.

2. The method of claim 1, wherein the outcome that is based on the external event comprises a first event outcome or a second event outcome that is different from the first event outcome, and wherein, responsive to an occurrence of the first event outcome, the entry corresponding to the chance game is determined to be a winner based on being randomly selected by being drawn from a first plurality of players in the chance game.

3. The method of claim 2, wherein, responsive to an occurrence of the second event outcome, the entry corresponding to the chance game is determined to be a winner based on being randomly selected by being drawn from a second plurality of players in the chance game that is different from the first plurality of players.

4. The method of claim 3, wherein the first plurality of players is assigned to a first pool of chance game entrants and the second plurality of players is assigned to a second pool of chance game entrants.

5. The method of claim 3, wherein a first quantity of the first plurality of players are determined to win the chance game comprising a first prize type, wherein a second quantity of the second plurality of players are determined to with the chance game comprising a second prize type that is different from the first prize type, and wherein the first quantity of the first plurality of players is different from the second quantity of the second plurality of players.

6. The method of claim 2, wherein, responsive to the occurrence of the second event outcome, the entry corresponding to the chance game is ineligible for participation in the chance game.

7. The method of claim 1, wherein the chance game characteristic comprises a type of prize that is provided to a winner of the chance game.

8. The method of claim 1, wherein the entry comprises an instant win lottery ticket that comprises a primary game.

9. The method of claim 8, wherein the chance game comprises a second chance game for the instant win lottery ticket, wherein the method further comprises receiving a registration of the instant win lottery ticket for participation in the chance game.

10. The method of claim 8, wherein the external event comprises an outcome corresponding to a sporting event.

11. The method of claim 1, wherein the entry is provided to a user based on exchanging non-currency points corresponding to a loyalty program.

12. The method of claim 1, wherein the entry comprises a digital lottery ticket that comprises a primary game that is accessed on a mobile terminal.

13. The method of claim 12, wherein the chance game comprises a second chance game for the digital lottery ticket, wherein the method further comprises receiving a registration of the digital lottery ticket for participation in the chance game.

14. The method of claim 1, wherein the external event outcome is unrelated to whether a user wins.

15. The method of claim 1, wherein the external event corresponds to a local interest event, and wherein the entry comprises data and graphics that correspond to the local interest event.

16. A system comprising:

a processor circuit; and a memory comprising machine-readable instructions that, when executed by the processor circuit, cause the processor circuit to:

provide a lottery game ticket that comprises data corresponding to a primary game;

receive a registration of the lottery game ticket corresponding to a chance game that comprises an outcome that is based on an external event;

determine, based on an outcome of the external event, a chance game characteristic to be applied to an entry for the chance game that corresponds to the lottery game ticket; and use the chance game characteristic to determine whether to provide a chance game award to a user, wherein the primary game and the external event are exclusive of one another and are relevant to one another based on the lottery game ticket.

17. The system of claim 16, wherein the outcome that is based on the external event comprises a first event outcome or a second event outcome that is different from the first event outcome, and wherein, responsive to an occurrence of the first event outcome, the lottery game ticket is determined to be a winner in the chance game based on being randomly selected by being drawn from a first plurality of players in the chance game.

18. The system of claim 17, wherein, responsive to an occurrence of the second event outcome, the lottery game ticket is determined to be a winner of the chance game based on being randomly selected by being drawn from a second plurality of players in the chance game, wherein the second plurality of players is different from the first plurality of players.

19. The system of claim 17, wherein the primary game and the chance game comprise unrelated outcomes, and wherein the winner of the chance game is based on a random drawing that corresponds to the chance game characteristic.

20. A gaming device comprising:

a processor circuit; and a memory comprising machine-readable instructions that, when executed by the processor circuit, cause the processor circuit to:

provide a digital instant win lottery game ticket that comprises data corresponding to a primary game;

receive an offer to register the digital instant win lottery game ticket into a chance game; and cause registration of the digital instant win lottery game ticket corresponding to the chance game that comprises an outcome that is based on an external event that is unrelated to the chance game, wherein the chance game characteristic determines an available prize type and entrant pool for a random drawing.

* * * * *